(12) United States Patent
Zhao et al.

(10) Patent No.: US 10,880,057 B2
(45) Date of Patent: Dec. 29, 2020

(54) METHOD AND APPARATUS FOR DETERMINING RESOURCE OCCUPATION STATE

(71) Applicant: China Academy of Telecommunications Technology, Beijing (CN)

(72) Inventors: Rui Zhao, Beijing (CN); Yi Zhao, Beijing (CN); Haijun Zhou, Beijing (CN); Jiayi Fang, Beijing (CN); Lin Lin, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 54 days.

(21) Appl. No.: 16/322,115

(22) PCT Filed: Jul. 12, 2017

(86) PCT No.: PCT/CN2017/092669
§ 371 (c)(1),
(2) Date: Jan. 31, 2019

(87) PCT Pub. No.: WO2018/024084
PCT Pub. Date: Feb. 8, 2018

(65) Prior Publication Data
US 2019/0181997 A1    Jun. 13, 2019

(30) Foreign Application Priority Data
Aug. 2, 2016   (CN) .......................... 2016 1 0626183

(51) Int. Cl.
*H04W 4/00*   (2018.01)
*H04L 5/00*   (2006.01)
(Continued)

(52) U.S. Cl.
CPC ............ *H04L 5/0037* (2013.01); *H04L 5/001* (2013.01); *H04W 28/02* (2013.01); *H04W 72/1268* (2013.01)

(58) Field of Classification Search
None
See application file for complete search history.

(56) References Cited

U.S. PATENT DOCUMENTS

2016/0353477 A1* 12/2016 Wang .................. H04W 74/085
2017/0086216 A1*  3/2017 Patil ..................... H04W 72/044
(Continued)

FOREIGN PATENT DOCUMENTS

| CN | 105025513 A | 11/2015 |
|---|---|---|
| CN | 105101045 A | 11/2015 |

(Continued)

OTHER PUBLICATIONS

Ericsson; "Timing for EUL in CELL_FACH": 3GPP TSG RAN WG1 Meeting #53; R1-081881; Kansas City, MO, USA, May 5-9, 2008.
(Continued)

*Primary Examiner* — Clemence S Han
(74) *Attorney, Agent, or Firm* — Kilpatrick Townsend & Stockton, LLP

(57) ABSTRACT

Disclosed in the present invention are a method and an apparatus for determining resource occupation state. The method comprises: a first node receiving SA information sent by at least one second node, the SA information being used for indicating resource occupation state of the second node; at each state maintenance moment, the first node determining, according to the service transmission cycle of the first node itself and the SA information, the resource occupation state within the state maintenance cycle which has a length of the service transmission cycle of the first (Continued)

node The solutions provided in the embodiments of the present invention can effectively support the sensing of the resource occupation state in various service transmission cycles, and reduce the complexity of resource occupation state maintenance and resource selection.

17 Claims, 4 Drawing Sheets

(51) Int. Cl.
    *H04W 28/02*     (2009.01)
    *H04W 72/12*     (2009.01)

(56) References Cited

U.S. PATENT DOCUMENTS

| | | | | |
|---|---|---|---|---|
| 2017/0164381 | A1* | 6/2017 | Kim | H04L 5/0007 |
| 2017/0295554 | A1* | 10/2017 | Lee | H04J 11/00 |
| 2018/0213549 | A1* | 7/2018 | Kim | H04W 72/0486 |
| 2018/0359777 | A1* | 12/2018 | Lei | H04W 74/04 |

FOREIGN PATENT DOCUMENTS

| | | |
|---|---|---|
| CN | 105681439 A | 6/2016 |
| WO | 2016022849 A1 | 2/2016 |

OTHER PUBLICATIONS

Qualcomm Europe; "Details on PDCCH for DL data arrival"; 3GPP TSG-RAN WG1 #53; R1-081978; Kansas City, USA, May 5-9, 2008.

LG Electronics, "Discussion on details of scheduling assignment for PC5 based V2V", 3GPP TSG RAN WG1#85, R1-164517, Nanjing, China, May 23-27, 2016.

NTT DOCOMO, "Discussion on details of sensing with semi-persistent transmission", 3GPP TSG RAN WG1 Meeting #84bis, R1-163176; Apr. 15, 2016; Section 2.

Catt; "Discussion on sensing mechanism in PC5-based V2V",3GPP TSG RAN WG1 Meeting #85, R1-164203, May 27, 2016; The Whole Documents.

Intel Corporation,"Discussion on sensing aspects to support V2V communication with different transmission periodicity",3GPP TSG RAN WG1 Meeting #85, R1-165073, May 27, 2016; The Whole Documents.

ZTE: "Discussion on SA content", 3GPP DRAFT; R1-164966—Discussion on SA Content, 3rd Generation Partnership Project (3GPP), vol. RAN WG1; Nanjing, China; May 23, 2016-May 27, 2016.

* cited by examiner

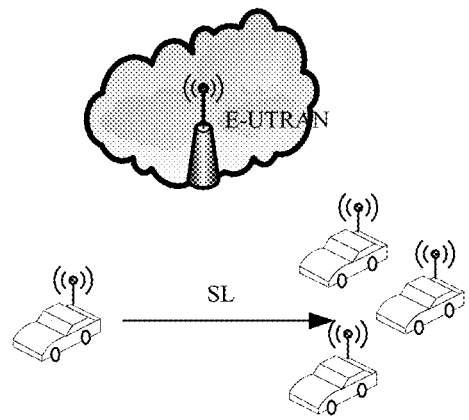

Fig. 1A

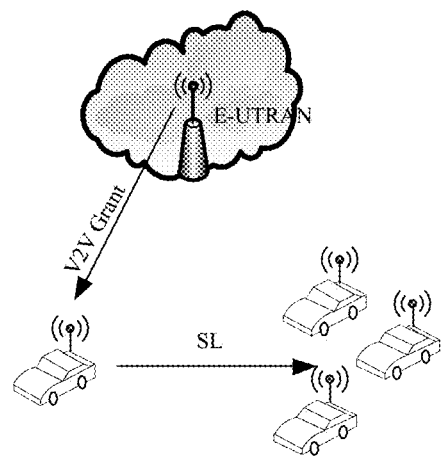

A first node receives SA information transmitted by at least one second node, where the SA information indicates a resource occupancy situation of the second node

S22

The first node determines a resource occupancy state in a state maintenance periodicity, a length of which is a traffic transmission periodicity of the first node, at each state maintenance instance of time according to the traffic transmission periodicity of the first node and the SA information

Fig. 2 ated as in the prior art, then a length of time
METHOD AND APPARATUS FOR DETERMINING RESOURCE OCCUPATION STATE This application is a National Stage of International Application No. PCT/CN2017/092669, filed Jul. 12, 2017, which claims priority to Chinese Patent Application No. 201610626183.7, filed Aug. 2, 2016, both of which are hereby incorporated by reference in their entireties.

FIELD

The present invention relates to the field of communications, and particularly to a method and apparatus for determining a resource occupancy state.

BACKGROUND

In a Long Term Evolution (LTE) system, large packets including an integral security certificate, and small packets including signature information of the security certificate shall be transmitted periodically in internet-of-vehicles communication, where a validity period of time of the security certificate is currently defined as 500 ms, and the signature information is only valid in a period of time (e.g., 500 ms) after the integral security certificate is received. By way of an example, if data are transmitted at a periodicity of 100 ms in internet-of-vehicles communication, then firstly one large packet and then four small packets may be transmitted. A resource occupancy state is detected in such a way that since the large packet and the small packets are transmitted over different resources, in order to select a resource effectively, it is preferable to predict an occupancy situation of resources in an entire period of time in which the large packet and the small packets are transmitted; and for example, if a traffic transmission periodicity is 100 ms, then an occupancy situation of resources in 500 ms in which one large packet and four small packets are transmitted will be determined.

At present, in the Vehicle to Vehicle (V2V) technologies based upon the Long Term Evolution (LTE) system, a User Equipment (UE) firstly transmits Scheduling Assignment (SA) information to indicate a resource to be occupied for transmitting data, and then transmits the data, and since the SA information and the data are transmitted over different channels, a receiver can firstly detect a control channel for the SA information, and then receives the data according to the detected SA information. At present, there are the following two resource selection schemes in the LTE-based V2V technologies.

In a first scheme, a User Equipment (UE) selects a resource on its own initiative as illustrated in FIG. 1A.

In this scheme, the UE can select a resource only after it detects an occupancy situation of resources, and typically the UE detects this in the following two ways: first, it obtains an indication of a resource occupied by another UE for transmitting data, according to received SA information of the other UE, and further selects an unoccupied resource to transmit its data; and second, it detects the energy of a resource directly, and if the energy is above some threshold, then it will determine that the corresponding resource has been occupied, otherwise, it will determine that the corresponding resource has not been occupied, and further select the unoccupied resource to transmit its data.

In a second scheme, the UE selects a resource with the aid of a base station, where when a vehicle is within a network coverage, the base station can schedule V2V communication using a downlink control channel (a Physical Downlink Control Channel (PDCCH) or an EPDCCH) as illustrated in FIG. 1B, and in this scheme, the base station transmits a V2V grant message to indicate positions of resources for the transmitter to transmit SA information and data.

In internet-of-vehicles communication, there is generally a fixed traffic transmission periodicity, so a subsequent occupancy situation of resources can be well predicated as described above so that a resource can be selected. In order to alleviate a congestion condition, the traffic transmission periodicity can be configured to be variable, and the traffic transmission periodicity can vary flexibly from 100 ms to 1000 ms as the current congestion condition and the vehicle are varying. In the case that the traffic transmission periodicity is varying, if the occupancy situation of resources is to be still determined as in the prior art, then a length of time for which a resource occupancy state is to be predicated will be the least common multiple of respective integral periodicities including a transmission pattern of all the large and small packets, so it will be very complex to maintain the resource occupancy state for such a long period of time, and also more complex to select a resource.

SUMMARY

Embodiments of the invention provide a method and apparatus for determining a resource occupancy state so as to address the problem in the prior art that in a situation a traffic transmission periodicity is varying, if a resource occupancy state is to be still determined as in the prior art, then it will be complex to maintain the resource occupancy state, and also more complex to select a resource.

In a first aspect, there is provided a method for determining a resource occupancy state, the method including: receiving, by a first node, SA information transmitted by at least one second node, where the SA information indicates a resource occupancy situation of the second node; and determining, by the first node, a resource occupancy state in a state maintenance periodicity, a length of which is a traffic transmission periodicity of the first node, at each state maintenance instance of time according to the traffic transmission periodicity of the first node and the SA information.

In a possible implementation, the SA information includes at least one of following information: information indicating a traffic transmission periodicity of the second node; information indicating a remaining number of times that a resource occupied by the second node can be occupied; or information indicating a time-frequency position of a resource occupied by the second node.

In a possible implementation, the information indicating the time-frequency position of the resource occupied by the second node includes at least one of following information: information indicating a frequency domain position of the resource occupied by the second node; or a first time offset, which represents an offset between an instance of time when the second node transmits the SA information, and a time domain position of the resource occupied by the second node.

In a possible implementation, determining, by the first node, the resource occupancy state in the state maintenance periodicity, the length of which is the traffic transmission periodicity of the first node, at each state maintenance instance of time according to the traffic transmission periodicity of the first node and the SA information includes: for a current state maintenance instance of time, determining, by the first node, a time domain position and a frequency domain position of a resource occupied by the second node according to the SA information, where an equivalent frequency domain position, of the resource occupied by the second node, in the state maintenance periodicity is the frequency domain position; and for a resource at a time domain position later than or equal to the current state maintenance instance of time, determining, by the first node, an equivalent time domain position of the resource in the state maintenance periodicity according to the traffic transmission periodicity of the first node and the time domain position of the resource.

In a possible implementation, determining, by the first node, the equivalent time domain position of the resource in the state maintenance periodicity according to the traffic transmission periodicity of the first node and the time domain position of the resource includes: performing, by the first node, a modulus operation on the time domain position of the resource and the state maintenance periodicity; and determining, by the first node, a value obtained as a result of the modulus operation as the equivalent time domain position of the resource in the state maintenance periodicity.

In a possible implementation, for the current state maintenance instance of time, the first node determines the time domain position of the resource occupied by the second node according to the SA information in an equation of: $R\_t(n)=\text{offset}+n*T2$, where $R\_t(n)$ is the time domain position of the resource occupied by the second node; offset is a value of a second time offset corresponding to the current state maintenance instance of time, where the second time offset represents an offset between a state maintenance instance of time and the time domain position of the resource occupied by the second node; T2 is a traffic transmission periodicity of the second node, and $n=0, 1, \ldots, N$, where N is a remaining number of times that the resource occupied by the second node can be occupied.

In a possible implementation, if there is any one $R\_t(n)$ greater than or equal to 0, then a time domain position of a resource corresponding to $R\_t(n)$ is later than or equal to the current state maintenance instance of time; or if there is any one $R\_t(n)$ less than 0, then a time domain position of a resource corresponding to $R\_t(n)$ is earlier than the current state maintenance instance of time.

In a possible implementation, the value of the second time offset corresponding to the current state maintenance instance of time is a value of the second time offset corresponding to a last state maintenance instance of time minus a time difference, where the time difference is an interval of time between the current state maintenance instance of time and the last state maintenance instance of time, where an initial value of the second time offset is determined according to a value of a first time offset in the SA information, and the first time offset represents an offset between an instance of time when the second node transmits the SA information, and the time domain position of the resource occupied by the second node.

In a possible implementation, there is a same interval of time between any two adjacent state maintenance instances of time.

In a second aspect, there is provided a computer readable storage medium storing executable program codes configured to perform the method according to the first aspect.

In a third aspect, there is provided an apparatus for determining a resource occupancy state, the apparatus including: a receiving module configured to receive scheduling assignment (SA) information transmitted by at least one second node, where the SA information indicates a resource occupancy situation of the second node; and a state maintaining module configured to determine a resource occupancy state in a state maintenance periodicity, a length of which is a traffic transmission periodicity of the apparatus, at each state maintenance instance of time according to the traffic transmission periodicity of the apparatus and the SA information.

In a possible implementation, the SA information includes at least one of following information: information indicating a traffic transmission periodicity of the second node; information indicating a remaining number of times that a resource occupied by the second node can be occupied; or information indicating a time-frequency position of a resource occupied by the second node.

In a possible implementation, the information indicating the time-frequency position of the resource occupied by the second node includes at least one of following information: information indicating a frequency domain position of the resource occupied by the second node; or a first time offset, which represents an offset between an instance of time when the second node transmits the SA information, and the time domain position of the resource occupied by the second node.

In a possible implementation, the state maintaining module is configured: for a current state maintenance instance of time, to determine a time domain position and a frequency domain position of a resource occupied by the second node according to the SA information, where an equivalent frequency domain position, of the resource occupied by the second node, in the state maintenance periodicity is the frequency domain position; and for a resource at a time domain position later than or equal to the current state maintenance instance of time, to determine an equivalent time domain position of the resource in the state maintenance periodicity according to the traffic transmission periodicity of the apparatus and the time domain position of the resource.

In a possible implementation, the state maintaining module is configured to: perform a modulus operation on the time domain position of the resource and the state maintenance periodicity, and determine a value obtained as a result of the modulus operation as the equivalent time domain position of the resource in the state maintenance periodicity.

In a possible implementation, for the current state maintenance instance of time, the state maintaining module is configured to determine the time domain position of the resource occupied by the second node according to the SA information in an equation of: $R\_t(n)=\text{offset}+n*T2$, where $R\_t(n)$ is the time domain position of the resource occupied by the second node; offset is a value of a second time offset corresponding to the current state maintenance instance of time, where the second time offset represents an offset between a state maintenance instance of time and the time domain position of the resource occupied by the second node; T2 is a traffic transmission periodicity of the second node, and $n=0, 1, \ldots, N$, where N is a remaining number of times that the resource occupied by the second node can be occupied.

In a possible implementation, if there is any one $R\_t(n)$ greater than or equal to 0, then a time domain position of a resource corresponding to $R\_t(n)$ is later than or equal to the current state maintenance instance of time; or if there is any one $R\_t(n)$ less than 0, then a time domain position of a resource corresponding to $R\_t(n)$ is earlier than the current state maintenance instance of time.

In a possible implementation, the value of the second time offset corresponding to the current state maintenance instance of time is a value of the second time offset corresponding to a last state maintenance instance of time minus a time difference, where the time difference is an interval of time between the current state maintenance instance of time and the last state maintenance instance of time, where an initial value of the second time offset is determined according to a value of a first time offset in the SA information, and the first time offset represents an offset between an instance of time when the second node transmits the SA information, and the time domain position of the resource occupied by the second node.

In a possible implementation, there is a same interval of time between any two adjacent state maintenance instances of time.

In a fourth aspect, there is provided an apparatus for determining a resource occupancy state, the apparatus including a processor, a transceiver, and a memory, where the processor is configured to read and execute programs in the memory to: receive scheduling assignment (SA) information transmitted by at least one second node through the transceiver, where the SA information indicates a resource occupancy situation of the second node; and determine a resource occupancy state in a state maintenance periodicity, a length of which is a traffic transmission periodicity of the apparatus, at each state maintenance instance of time according to the traffic transmission periodicity of the apparatus and the SA information; and the transceiver is configured to receive and transmit data under the control of the processor.

In a possible implementation, the SA information includes at least one of following information: information indicating a traffic transmission periodicity of the second node; information indicating a remaining number of times that a resource occupied by the second node can be occupied; or information indicating a time-frequency position of a resource occupied by the second node.

In a possible implementation, the information indicating the time-frequency position of the resource occupied by the second node includes at least one of following information: information indicating a frequency domain position of the resource occupied by the second node; or a first time offset, which represents an offset between an instance of time when the second node transmits the SA information, and the time domain position of the resource occupied by the second node.

In a possible implementation, the processor is configured to read and execute the pogroms in the memory: for a current state maintenance instance of time, to determine a time domain position and a frequency domain position of a resource occupied by the second node according to the SA information, where an equivalent frequency domain position, of the resource occupied by the second node, in the state maintenance periodicity is the frequency domain position; and for a resource at a time domain position later than or equal to the current state maintenance instance of time, to determine an equivalent time domain position of the resource in the state maintenance periodicity according to the traffic transmission periodicity of the apparatus and the time domain position of the resource.

In a possible implementation, the processor is configured to read and execute the pogroms in the memory to: perform a modulus operation on the time domain position of the resource and the state maintenance periodicity, and determine a value obtained as a result of the modulus operation as the equivalent time domain position of the resource in the state maintenance periodicity.

In a possible implementation, for the current state maintenance instance of time, the processor is configured to determine the time domain position of the resource occupied by the second node according to the SA information in an equation of: $R\_t(n)=\text{offset}+n*T2$, where $R\_t(n)$ is the time domain position of the resource occupied by the second node; offset is a value of a second time offset corresponding to the current state maintenance instance of time, where the second time offset represents an offset between a state maintenance instance of time and the time domain position of the resource occupied by the second node; T2 is a traffic transmission periodicity of the second node, and $n=0, 1, \ldots, N$, where N is a remaining number of times that the resource occupied by the second node can be occupied.

In a possible implementation, if there is any one $R\_t(n)$ greater than or equal to 0, then a time domain position of a resource corresponding to $R\_t(n)$ is later than or equal to the current state maintenance instance of time; or if there is any one $R\_t(n)$ less than 0, then a time domain position of a resource corresponding to $R\_t(n)$ is earlier than the current state maintenance instance of time.

In a possible implementation, the value of the second time offset corresponding to the current state maintenance instance of time is a value of the second time offset corresponding to a last state maintenance instance of time minus a time difference, where the time difference is an interval of time between the current state maintenance instance of time and the last state maintenance instance of time, where an initial value of the second time offset is determined according to a value of a first time offset in the SA information, and the first time offset represents an offset between an instance of time when the second node transmits the SA information, and the time domain position of the resource occupied by the second node.

In a possible implementation, there is a same interval of time between any two adjacent state maintenance instances of time.

In the method and apparatus according to the embodiments of the invention, a first node receives SA information transmitted by at least one second node, where the SA information indicates a resource occupancy situation of the second node; and the first node determines a resource occupancy state in a state maintenance periodicity, the length of which is a traffic transmission periodicity of the first node, at each state maintenance instance of time according to its traffic transmission periodicity and the SA information. Since the first node determines the resource occupancy state in the state maintenance periodicity at each state maintenance instance of time according to its traffic transmission periodicity and the received SA information, a resource occupancy state with a plurality of traffic transmission periodicities can be detected effectively, and it will be less complex to maintain the resource occupancy state, and to select a resource.

BRIEF DESCRIPTION OF THE DRAWINGS

FIG. 1A is a schematic diagram of a scheme in which a UE selects a resource on its own initiative.

FIG. 1B is a schematic diagram of a scheme in which a UE selects a resource under the aid of a base station.

FIG. 2 is a schematic flow chart of a method for determining a resource occupancy state according to an embodiment of the invention.

DETAILED DESCRIPTION OF THE EMBODIMENTS

Figure 3:
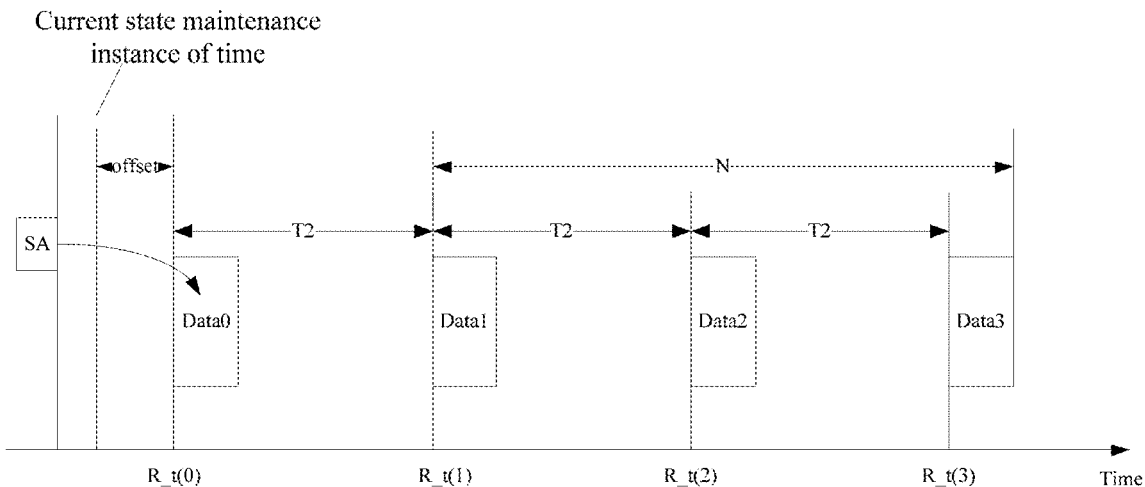
FIG. 3 is a schematic diagram of time-frequency positions of resources occupied by a second node, which are determined by a first node, according to an embodiment of the invention.

In order to make the objects, technical solutions, and advantages of the embodiments of the invention more apparent, the technical solutions according to the embodiments of the invention will be described below clearly and fully with reference to the drawings in the embodiments of the invention, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

In order to describe the technical solutions according to the embodiments of the invention, different transmission nodes in a network will be distinguished using such terms as "first", "second", etc., but the number of transmission nodes, and their operating priorities will not be limited thereto, where a first node refers to any one of the transmission nodes in the network, and a second node refers to any one of the other transmission nodes in the network than the first node.

"A (the) plurality of" as mentioned in the embodiments of the invention refers to two or more than two.

The technical solutions according to the embodiments of the invention can be applicable to various communication systems, for example, including 2G; 3G, 4G and 5G communication systems, and next-generation communication systems, e.g., a Global System for Mobile communication (GSM) system, a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency Division Multiple Access (OFDMA) system, a Single-Carrier Frequency Division Multiple Access (SC-FDMA) system, a General Packet Radio Service (GPRS) system, a Long Term Evolution (LTE) system, etc.

The first node and the second node in the embodiments of the invention can be a network-side device, e.g., a base station, or can be a user equipment, e.g., a wireless terminal, etc.

A resource in the embodiments of the invention can be a Physical Resource Block (PRB), or can be a Resource Element (RE), or can be an Orthogonal Frequency Division Multiplex (OFDM) symbol. The resource will not be limited to any particular implementation form in the embodiments of the invention.

If a resource in the embodiments of the invention is a PRB, then one resource may occupy one PRB, or may occupy a plurality of PRBs, where if one resource occupies a plurality of PRBs, then the plurality of PRBs may be consecutive, or may be inconsecutive. If a resource in the embodiments of the invention is an RE, then one resource may occupy one RE, or may occupy a plurality of REs, where if one resource occupies a plurality of REs, then the plurality of REs may be consecutive, or may be inconsecutive. If a resource in the embodiments of the invention is an OFDM symbol, then one resource may occupy one OFDM symbol, or may occupy a plurality of OFDM symbols, where if one resource occupies a plurality of OFDM symbols, then the plurality of OFDM symbols may be consecutive, or may be inconsecutive.

The embodiments of the invention will be described below in further details with reference to the drawings. It shall be appreciated that the embodiments to be described here are only intended to illustrate and describe the invention, but not to limit the invention thereto.

In an embodiment as illustrated in FIG. 2, there is provided a method for determining a resource occupancy state, where the method includes the following operations.

In the operation S21, a first node receives SA information transmitted by at least one second node, where the SA information indicates a resource occupancy situation of the second node.

Where a second node can occupy one resource or a plurality of resources in a traffic transmission periodicity of the second node.

In the operation S22, the first node determines a resource occupancy state in a state maintenance periodicity, a length of which is a traffic transmission periodicity of the first node, at each state maintenance instance of time according to the traffic transmission periodicity of the first node and the SA information.

Particularly, if the first node receives SA information transmitted by a plurality of second nodes before the current state maintenance instance of time, then it will maintain the resource occupancy state according to its traffic transmission periodicity and all the received SA information.

Furthermore, the first node can select an idle resource, and perform transmission, based upon the maintained resource occupancy state when it needs to transmit SA information and/or data.

In the embodiment of the invention, since the first node determines the resource occupancy state in the state maintenance periodicity at each state maintenance instance of time according to its traffic transmission periodicity and the received SA information, a resource occupancy state with a plurality of traffic transmission periodicities can be detected effectively, and it will be less complex to maintain the resource occupancy state, and to select a resource.

In the embodiment of the invention, the first node can predict its traffic transmission periodicity according to at least one of the congestion situation of the current network (e.g., the density of vehicles in a vehicle network), a traffic type or a traffic priority of the first node, or, a traffic type or a traffic priority of the second node, and reference can be made to the related description in the J2945.1 of the Society of Automotive Engineers (SAE) for details thereof, so a repeated description thereof will be omitted here.

In the embodiment of the invention, the SA information includes at least one of: information indicating a traffic transmission periodicity of the second node, information indicating a remaining number of times that a resource occupied by the second node can be occupied, or information indicating a time-frequency position of a resource occupied by the second node.

In a possible implementation, the information indicating the time-frequency position of the resource occupied by the second node includes at least one of: information indicating a frequency domain position of the resource occupied by the second node, or information indicating a time domain position of the resource occupied by the second node.

In a possible implementation, the information indicating the time domain position of the resource occupied by the second node is a first time offset, where the first time offset represents an offset between an instance of time when the second node transmits the SA information, and the time domain position of the resource occupied by the second node.

Of course, the information indicating the time domain position of the resource occupied by the second node can be other information than the first time offset in another implementation, and for example, the information is the number of a sub-frame including the resource occupied by the second node; in another example, the information is an offset between a sub-frame including the resource occupied by the second node, and a specified sub-frame; in still another example, the information is a function of the number of a sub-frame including the resource occupied by the second node; etc.

In the embodiment of the invention, the information indicating the frequency domain position of the resource occupied by the second node can be the frequency domain position of the resource occupied by the second node, and for example, the information is the number of a sub-carrier including the resource occupied by the second node; or the information can be other information which can indicate the frequency domain position of the resource occupied by the second node, and for example, the information is an offset between a sub-carrier including the resource occupied by the second node, and a central frequency; in another example, the information is the number of a sub-carrier including the resource occupied by the second node, multiplied with a preset factor, etc.

In the embodiment of the invention, the information indicating the traffic transmission periodicity of the second node can be the traffic transmission periodicity of the second node, or can be other information which can indicate the traffic transmission periodicity of the second node, and for example, the information is a multiple of the least unit of the traffic transmission periodicity of the second node; in another example, the information is a function of the traffic transmission periodicity of the second node; etc.

In the embodiment of the invention, the information indicating the remaining number of times that the resource occupied by the second node can be occupied can be the remaining number of times that the resource occupied by the second node can be occupied, or can be other information which can indicate the remaining number of times that the resource occupied by the second node can be occupied, and for example, the information can be a function of the remaining number of times that the resource occupied by the second node can be occupied, where the remaining number of times that a resource can be occupied refers to the number of times that the resource can be occupied after the resource is occupied for the first time.

It shall be noted that, a second node can occupy only one resource or can occupy a plurality of resources, in a traffic transmission periodicity of the second node, and for example, the second node occupies three resources in the traffic transmission periodicity thereof, where it initially transmits over the first resource, and retransmits over the second and third resources.

If a second node transmits data over a plurality of resources in the traffic transmission periodicity of the second node, then the SA transmitted by the second node will carry indication information indicating time-frequency positions of the respective resources occupied by the second node.

By way of an example in which a SA carries information indicating a frequency domain position of a resource occupied by a second node, and a first amount of time, if the second node occupies a plurality of resources in the traffic transmission periodicity thereof, then the SA will carry indication information indicating frequency domain positions of the respective resources, and first amounts of time corresponding to the respective resources, where if the frequency domain positions of the plurality of resources occupied by the second node are the same, then the SA will only carry indication information indicating only one of the time-frequency positions.

Further to any one of the embodiments above, a possible implementation of S22 is as follows.

For a current state maintenance instance of time, the first node determines a time domain position and a frequency domain position of a resource occupied by the second node according to the SA information, where an equivalent frequency domain position, of the resource occupied by the second node, in the state maintenance periodicity is the frequency domain position; and for a resource at a time domain position later than or equal to the current state maintenance instance of time, the first node determines an equivalent time domain position of the resource in the state maintenance periodicity according to the traffic transmission periodicity of the first node and the time domain position of the resource.

Particularly, after each state maintenance instance of time arrives, the first node firstly determines a time domain position and a frequency domain position of a resource occupied by a second node according to the SA information of the second node, and then determines an equivalent time-frequency position, of the resource occupied by the second node, in the state maintenance periodicity, where an equivalent frequency domain position, of the resource occupied by the second node, in the state maintenance periodicity is the frequency domain position of the resource. In order to determine the equivalent time domain position, for each resource occupied by the second node, it is determined whether an instance of time corresponding to a time domain position of the resource lies before the current state maintenance instance of time. If the instance of time corresponding to the time domain position of the resource lies before the current state maintenance instance of time, then it will indicate that the resource is a resource which was occupied in the past, and has no influence upon resource selection by the first node, so the occupancy state of the resource will not be maintained; and if the instance of time corresponding to the time domain position of the resource is or lies after the current state maintenance instance of time, the it will indicate that the first node to select a resource cannot select the resource, and the occupancy state of the resource will be maintained in a resource state table.

In a possible implementation, the first node determines the equivalent time domain position of the resource in the state maintenance periodicity according to the traffic transmission periodicity of the first node and the time domain position of the resource as follows: the first node performs a modulus operation on the time domain position of the resource and the state maintenance periodicity, and the first node determines a value obtained as a result of the modulus operation as the equivalent time domain position of the resource in the state maintenance periodicity.

In a possible implementation, for the current state maintenance instance of time, the first node can determine a time domain position of a resource occupied by a second node in an equation of: $R\_t(n) = \text{offset} + n*T2$.

Where $R\_t(n)$ is the time domain position of the resource occupied by the second node; offset is a value of a second time offset corresponding to the current state maintenance instance of time, where the second time offset represents an offset between a state maintenance instance of time, and the time domain position of the resource occupied by the second node; T2 is a traffic transmission periodicity of the second node, and n=0, 1, . . . , N, where N is a remaining number of times that the resource occupied by the second node can be occupied.

As illustrated in FIG. 3, Data0 is a data transmission resource associated directly with the SA transmitted by the second node, i.e., a resource which can be determined directly according to the information indicating the frequency domain position, and the information indicating the first time offset, both of which are carried in the SA, and Data1, Data2, and Data3 are resources, to be possibly occupied subsequently, determined according to resource reservation information (i.e., the information indicating the remaining number of times that the resource occupied by the second node can be occupied).

Furthermore, if the current instance of time is 0, then: if there is any one $R\_t(n)$ greater than or equal to 0, then it will indicate that a time domain position of a resource corresponding to $R\_t(n)$ is later than or equal to the current state maintenance instance of time; or if there is any one $R\_t(n)$ less than 0, then it will indicate that a time domain position of a resource corresponding to $R\_t(n)$ is earlier than the current state maintenance instance of time.

Here, the second time offset is decrementing over time, and the value of the second time offset corresponding to the current state maintenance instance of time is a value of the second time offset corresponding to the last state maintenance instance of time minus a time difference, where the time difference is an interval of time between the current state maintenance instance of time and the last state maintenance instance of time, where an initial value of the second time offset is determined according to a value of a first time offset in the SA information, and the first time offset represents an offset between an instance of time when the second node transmits the SA information, and the time domain position of the resource occupied by the second node.

Particularly, the initial value of the second time offset is the value of the first time offset minus $\Delta T$, where $\Delta T$ is a difference between an instance of time when the SA information is received, and a first state maintenance instance of time that follows, and if the instance of time when the SA information is received is the same instance of time as the first state maintenance instance of time that follows, then $\Delta T$ will be 0, that is, the value of the second time offset is equal to the value of the first time offset.

In a possible implementation, there is the same interval of time between any two adjacent state maintenance instances of time.

For example, the interval of time is set to a length of one sub-frame, so the start instance of time of each sub-frame is a state maintenance instance of time, and a value of the second time offset corresponding to the current sub-frame is a value of the second time offset corresponding to the last sub-frame minus 1.

The method for determining a resource occupancy state according to the embodiment of the invention will be described below in a particular embodiment thereof.

The first Embodiment is as follows.

Figure 4:
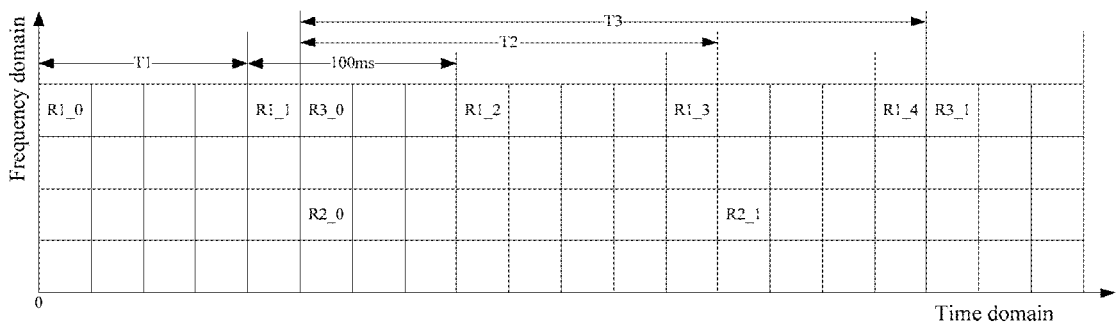
FIG. 4 is a schematic diagram of a resource occupancy state determined according to a first embodiment of the invention.

For example, a UE4 receives SA information transmitted respectively by a UE1, a UE2, and a UE3, and the UE4 can determine a reservation occupancy situation of resources in a subsequent period of time by detecting the received SA information; and particularly, the UE1 has a traffic transmission periodicity T1, and occupies a resource R1 at time-frequency positions R1_0, R1_1, R1_2, R1_3, and R1_4 respectively; the UE2 has a traffic transmission periodicity T2, and occupies a resource R2 at time-frequency positions R2_0 and R2_1 respectively; and the UE3 has a traffic transmission periodicity T3, and occupies a resource R3 at time-frequency positions R3_0 and R3_1 respectively, as illustrated in FIG. 4.

Figure 5:
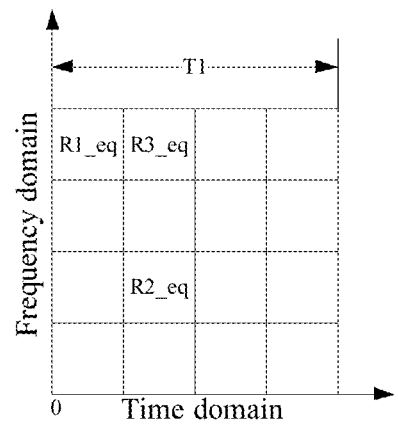
FIG. 5 is a schematic diagram of equivalent time-frequency positions according to the first embodiment of the invention.

If a traffic transmission periodicity of the UE4 is T1, then an equivalent modulus operation can be performed on the time-frequency positions of the resources occupied by the UE1, the UE2, and the UE3 according to T1 at an instance T0 of time (i.e., a state maintenance instance of time) to thereby determine a pattern of equivalent time-frequency positions, of the resources occupied by the UE1, the UE2, and the UE3, in a state maintenance periodicity with a length T1 of time as illustrated in FIG. 5, and apparently there is an equivalent processing relationship between this equivalent resource occupancy result and the real resource occupancy result. For example, both the resource R2 and the resource R3 are idle at a first period T1 of time, but the resources R2 and R3 cannot be used for transmitting traffic with the periodicity T1 of UE4, since with this equivalent operation, it can be determined that resource confliction will happen at the resources R2 and R3 subsequently.

Figure 6:
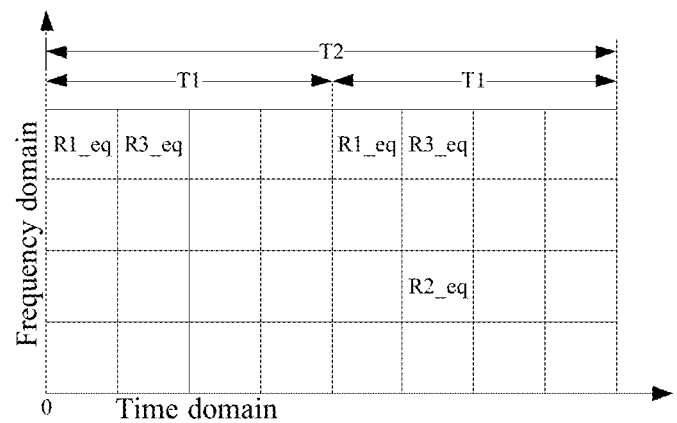
FIG. 6 is a schematic diagram of other equivalent time-frequency positions according to the first embodiment of the invention.

If a traffic transmission periodicity of the UE4 is T2, then an equivalent modulus operation can be performed on the time-frequency positions of the resources occupied by the UE1, the UE2, and the UE3 according to T2 at an instance T0 of time to thereby determine a pattern of equivalent time-frequency positions, of the resources occupied by the UE1, the UE2, and the UE3, in a state maintenance periodicity with a length T2 of time as illustrated in FIG. 6, and apparently there is an equivalent processing relationship between this equivalent resource occupancy result and the real resource occupancy result. For example, the resource R2 at a first period T1 of time can be used for transmitting traffic with the periodicity T2 of UE4, and with this equivalent operation, it can be determined that resource confliction will happen at the resource R3 subsequently.

Figure 7:
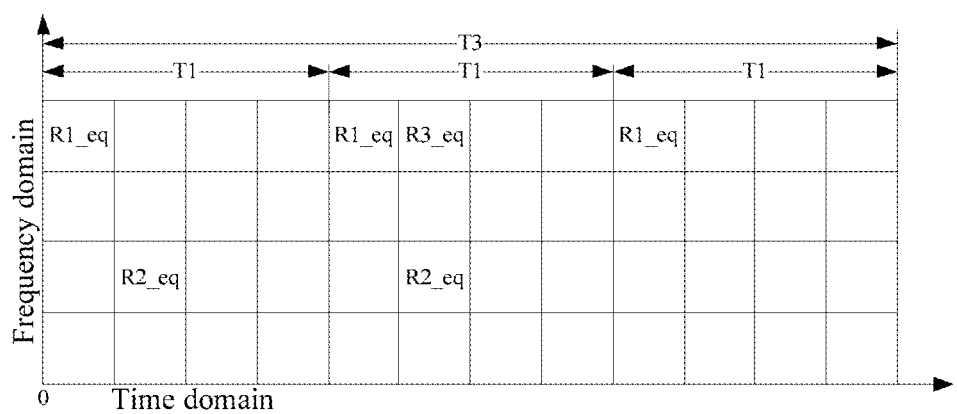
FIG. 7 is a schematic diagram of still other equivalent time-frequency positions according to the first embodiment of the invention.

If a traffic transmission periodicity of the UE4 is T3, then an equivalent modulus operation can be performed on the time-frequency positions of the resources occupied by the UE1, the UE2, and the UE3 according to T3 at an instance T0 of time to thereby determine a pattern of equivalent time-frequency positions, of the resources occupied by the UE1, the UE2, and the UE3, in a state maintenance periodicity with a length T3 of time as illustrated in FIG. 7, and apparently there is an equivalent processing relationship between this equivalent resource occupancy result and the real resource occupancy result. For example, the resource R3 at a first period T1 of time can be used for transmitting traffic with the periodicity T3 of UE4, and with this equivalent operation, it can be determined that resource confliction will happen at the resource R2 subsequently.

The processing flow of the method above can be performed in software program(s), which can be stored in a storage medium, and the stored software program(s) can perform the operations in the method above upon being invoked.

Based upon the same inventive idea, an embodiment of the invention further provides an apparatus for determining a resource occupancy state, and the apparatus addresses the problem under a similar principle to the method for determining a resource occupancy state according to the embodiment as illustrated in FIG. 2, reference can be made to the implementation of the method for an implementation of the apparatus, and a repeated description thereof will be omitted here.

Figure 8:
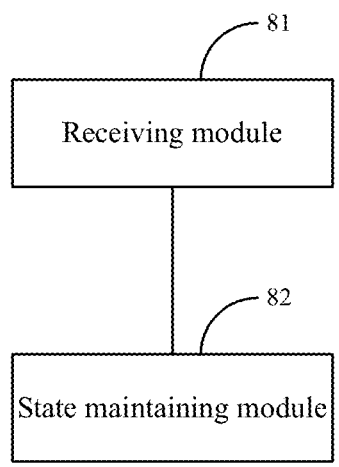
FIG. 8 is a schematic diagram of an apparatus for determining a resource occupancy state according to an embodiment of the invention.

In an embodiment as illustrated in FIG. 8, there is provided an apparatus for determining a resource occupancy state, where the apparatus includes: a receiving module 81 configured to receive Scheduling Assignment (SA) information transmitted by at least one second node, where the SA information indicates a resource occupancy situation of the second node; and a state maintaining module 82 configured to determine a resource occupancy state in a state maintenance periodicity, a length of which is a traffic transmission periodicity of the apparatus, at each state maintenance instance of time according to the traffic transmission periodicity of the apparatus and the SA information.

In a possible implementation, the SA information includes at least one of: information indicating a traffic transmission periodicity of the second node; information indicating a remaining number of times that a resource occupied by the second node can be occupied; or information indicating a time-frequency position of a resource occupied by the second node.

In a possible implementation, the information indicating the time-frequency position of the resource occupied by the second node includes at least one of: information indicating a frequency domain position of the resource occupied by the second node; or a first time offset, which represents an offset between an instance of time when the second node transmits the SA information, and the time domain position of the resource occupied by the second node.

In a possible implementation, the state maintaining module 82 is configured: for a current state maintenance instance of time, to determine a time domain position and a frequency domain position of a resource occupied by the second node according to the SA information, where an equivalent frequency domain position, of the resource occupied by the second node, in the state maintenance periodicity is the frequency domain position; and for a resource at a time domain position later than or equal to the current state maintenance instance of time, to determine an equivalent time domain position of the resource in the state maintenance periodicity according to the traffic transmission periodicity of the apparatus and the time domain position of the resource.

In a possible implementation, the state maintaining module 82 is configured to: perform a modulus operation on the time domain position of the resource and the state maintenance periodicity, and determine a value obtained as a result of the modulus operation as the equivalent time domain position of the resource in the state maintenance periodicity.

In a possible implementation, for the current state maintenance instance of time, the state maintaining module 82 is configured to determine the time domain position of the resource occupied by the second node according to the SA information in an equation of: R_t(n)=offset+n*T2.

Where R_t(n) is the time domain position of the resource occupied by the second node; offset is a value of a second time offset corresponding to the current state maintenance instance of time, where the second time offset represents an offset between a state maintenance instance of time, and the time domain position of the resource occupied by the second node; T2 is a traffic transmission periodicity of the second node, and n=0, 1, . . . , N, where N is a remaining number of times that the resource occupied by the second node can be occupied.

Furthermore, if there is any one R_t(n) greater than or equal to 0, then a time domain position of a resource corresponding to R_t(n) is later than or equal to the current state maintenance instance of time; or if there is any one R_t(n) less than 0, then a time domain position of a resource corresponding to R_t(n) is earlier than the current state maintenance instance of time.

In a possible implementation, the value of the second time offset corresponding to the current state maintenance instance of time is a value of the second time offset corresponding to the last state maintenance instance of time minus a time difference, where the time difference is an interval of time between the current state maintenance instance of time and the last state maintenance instance of time, where an initial value of the second time offset is determined according to a value of a first time offset in the SA information, and the first time offset represents an offset between an instance of time when the second node transmits the SA information, and the time domain position of the resource occupied by the second node.

In a possible implementation, there is the same interval of time between any two adjacent state maintenance instances of time.

A structure of and processing in the apparatus according to the embodiment of the invention will be described below in connection with a preferable hardware structure thereof.

Figure 9:
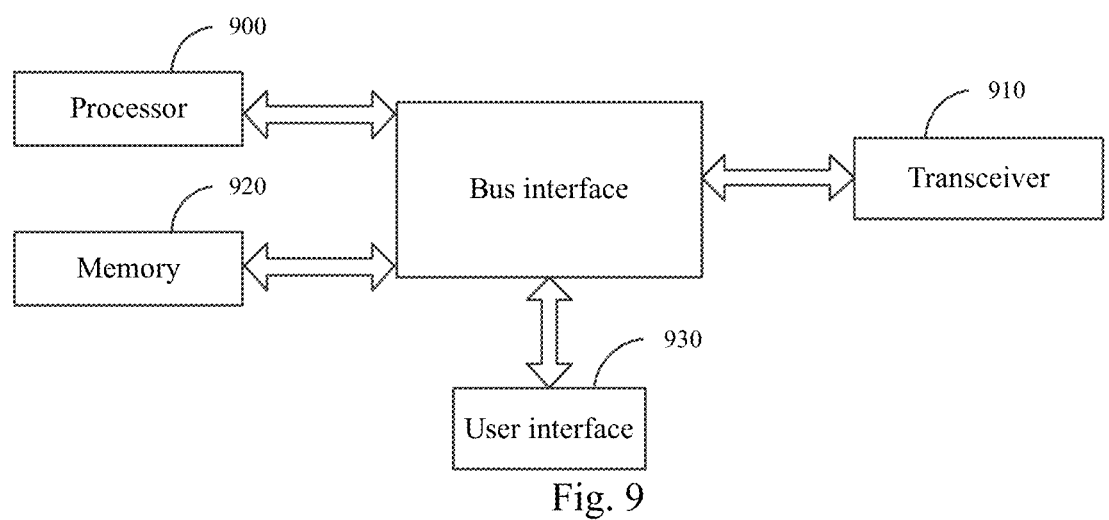
FIG. 9 is a schematic diagram of another apparatus for determining a resource occupancy state according to an embodiment of the invention.

In an embodiment as illustrated in FIG. 9, the apparatus includes a processor 900, a transceiver 910, and a memory 920, where the processor 900 is configured to read and execute programs in the memory 920 to: receive Scheduling Assignment (SA) information transmitted by at least one second node through the transceiver, where the SA information indicates a resource occupancy situation of the second node; and determine a resource occupancy state in a state maintenance periodicity, a length of which is a traffic transmission periodicity of the apparatus, at each state maintenance instance of time according to the traffic transmission periodicity of the apparatus and the SA information; and the transceiver 910 is configured to receive and transmit data under the control of the processor 900.

Here in FIG. 9, the bus architecture can include any number of interconnecting buses and bridges to particularly link together various circuits including one or more processors represented by the processor 900, and one or more memories represented by the memory 920. The bus architecture can further link together various other circuits, e.g., a peripheral device, a manostat, a power management circuit, etc., all of which are well known in the art, so a further description thereof will be omitted in this context. The bus interface serves as an interface. The transceiver 910 can be a number of elements, e.g., a transmitter and a receiver, which are units for communication with various other devices over a transmission medium. For different user equipment, the user interface 930 can also be an interface via which devices are connected internally and externally as needed, and the connected devices include but will not be limited to a keypad, a monitor, a speaker, a microphone, a joystick, etc.

The processor 900 is responsible for managing the bus architecture and performing normal processes, and the memory 920 can store data for use by the processor 900 in performing the operations.

In a possible implementation, the SA information includes at least one of: information indicating a traffic transmission periodicity of the second node; information indicating a remaining number of times that a resource occupied by the second node can be occupied; or information indicating a time-frequency position of a resource occupied by the second node.

In a possible implementation, the information indicating the time-frequency position of the resource occupied by the second node includes at least one of: information indicating a frequency domain position of the resource occupied by the second node; or a first time offset, which represents an offset between an instance of time when the second node transmits the SA information, and the time domain position of the resource occupied by the second node.

In a possible implementation, the processor 900 is configured to read and execute the programs in the memory 920 to: determine, for a current state maintenance instance of time, a time domain position and a frequency domain position of a resource occupied by the second node according to the SA information, where an equivalent frequency domain position, of the resource occupied by the second node, in the state maintenance periodicity is the frequency domain position; and for a resource at a time domain position later than or equal to the current state maintenance instance of time, determine an equivalent time domain position of the resource in the state maintenance periodicity according to the traffic transmission periodicity of the apparatus, and the time domain position of the resource.

In a possible implementation, the processor 900 is configured to read and execute the programs in the memory 920 to: perform a modulus operation on the time domain position of the resource and the state maintenance periodicity, and determine a value obtained as a result of the modulus operation as the equivalent time domain position of the resource in the state maintenance periodicity.

In a possible implementation, for the current state maintenance instance of time, the processor 900 is configured to determine the time domain position of the resource occupied by the second node according to the SA information in an equation of: $R\_t(n) = \text{offset} + n \cdot T2$.

Where $R\_t(n)$ is the time domain position of the resource occupied by the second node; offset is a value of a second time offset corresponding to the current state maintenance instance of time, where the second time offset represents an offset between a state maintenance instance of time, and the time domain position of the resource occupied by the second node; T2 is a traffic transmission periodicity of the second node, and $n=0, 1, \ldots, N$, where N is a remaining number of times that the resource occupied by the second node can be occupied.

Furthermore, if there is any one $R\_t(n)$ greater than or equal to 0, then a time domain position of a resource corresponding to $R\_t(n)$ is later than or equal to the current state maintenance instance of time; or if there is any one $R\_t(n)$ less than 0, then a time domain position of a resource corresponding to $R\_t(n)$ is earlier than the current state maintenance instance of time.

In a possible implementation, the value of the second time offset corresponding to the current state maintenance instance of time is a value of the second time offset corresponding to the last state maintenance instance of time minus a time difference, where the time difference is an interval of time between the current state maintenance instance of time and the last state maintenance instance of time, where an initial value of the second time offset is determined according to a value of a first time offset in the SA information, and the first time offset represents an offset between an instance of time when the second node transmits the SA information, and the time domain position of the resource occupied by the second node.

In a possible implementation, there is the same interval of time between any two adjacent state maintenance instances of time.

Based upon the same inventive idea, an embodiment of the invention further provides a computer storage medium. The computer readable storage medium stores computer executable instructions configured to cause the computer to perform the method according to the embodiment above of the invention.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Although embodiments of the invention have been described, those skilled in the art benefiting from the underlying inventive concept can make additional modifications and variations to these embodiments. Therefore the appended claims are intended to be construed as encompassing embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for determining a resource occupancy state, the method comprising:
   receiving, by a first node, Scheduling Assignment (SA) information transmitted by at least one second node, wherein the SA information indicates a resource occupancy situation of the second node; and
   determining, by the first node, a resource occupancy state in a state maintenance periodicity, a length of which is a traffic transmission periodicity of the first node, at each state maintenance instance of time according to the traffic transmission periodicity of the first node and the SA information;
   wherein the determining, by the first node, the resource occupancy state in the state maintenance periodicity, the length of which is the traffic transmission periodicity of the first node, at each state maintenance instance of time according to the traffic transmission periodicity of the first node and the SA information comprises:
   determining, by the first node, for a current state maintenance instance of time, a time domain position and a frequency domain position of a resource occupied by the second node according to the SA information, wherein an equivalent frequency domain position, of the resource occupied by the second node, in the state maintenance periodicity is the frequency domain position; and
   determining, by the first node, for a resource at a time domain position later than or equal to the current state maintenance instance of time, an equivalent time domain position of the resource in the state maintenance periodicity according to the traffic transmission periodicity of the first node and the time domain position of the resource.

2. The method according to claim 1, wherein the SA information comprises at least one of:
   information indicating a traffic transmission periodicity of the second node;
   information indicating a remaining quantity of times that a resource occupied by the second node is able to be occupied; or
   information indicating a time-frequency position of a resource occupied by the second node.

3. The method according to claim 2, wherein the information indicating the time-frequency position of the resource occupied by the second node comprises at least one of:
   information indicating a frequency domain position of the resource occupied by the second node; or
   a first time offset, which represents an offset between an instance of time when the second node transmits the SA information, and a time domain position of the resource occupied by the second node.

4. The method according to claim 1, wherein determining, by the first node, the equivalent time domain position of the resource in the state maintenance periodicity according to the traffic transmission periodicity of the first node and the time domain position of the resource comprises:
   performing, by the first node, a modulus operation on the time domain position of the resource and the state maintenance periodicity; and
   determining, by the first node, a value obtained as a result of the modulus operation as the equivalent time domain position of the resource in the state maintenance periodicity.

5. The method according to claim 1, wherein for the current state maintenance instance of time, the first node determines the time domain position of the resource occupied by the second node according to the SA information in an equation of:

$$R\_t(n)=\text{offset}+n*T2;$$

wherein $R\_t(n)$ is the time domain position of the resource occupied by the second node; offset is a value of a second time offset corresponding to the current state maintenance instance of time, wherein the second time offset represents an offset between a state maintenance instance of time, and the time domain position of the resource occupied by the second node; T2 is a traffic transmission periodicity of the second node, and $n=0, 1, \ldots, N$, wherein N is a remaining quantity of times that the resource occupied by the second node is able to be occupied.

6. The method according to claim 5, wherein if there is any one $R\_t(n)$ greater than or equal to 0, then a time domain position of a resource corresponding to $R\_t(n)$ is later than or equal to the current state maintenance instance of time; or
   if there is any one $R\_t(n)$ less than 0, then a time domain position of a resource corresponding to $R\_t(n)$ is earlier than the current state maintenance instance of time.

7. The method according to claim 5, wherein the value of the second time offset corresponding to the current state maintenance instance of time is a value of the second time offset corresponding to a last state maintenance instance of time minus a time difference, wherein the time difference is an interval of time between the current state maintenance instance of time and the last state maintenance instance of time;
   wherein an initial value of the second time offset is determined according to a value of a first time offset in the SA information, and the first time offset represents an offset between an instance of time when the second node transmits the SA information, and the time domain position of the resource occupied by the second node.

8. The method according to claim 1, wherein there is a same interval of time between any two adjacent state maintenance instances of time.

9. A non-transitory computer storage medium, storing computer executable instructions configured to cause the computer to perform the method according to claim 1.

10. An apparatus for determining a resource occupancy state, the apparatus comprising at least one processor and a memory; wherein the memory is configured to store readable program codes, and the at least one processor is configured to execute the readable program codes to:
    receive Scheduling Assignment (SA) information transmitted by at least one second node, wherein the SA information indicates a resource occupancy situation of the second node; and
    determine a resource occupancy state in a state maintenance periodicity, a length of which is a traffic transmission periodicity of the apparatus, at each state maintenance instance of time according to the traffic transmission periodicity of the apparatus and the SA information;

wherein the at least one processor is further configured to execute the readable program codes to:

determine, for a current state maintenance instance of time, a time domain position and a frequency domain position of a resource occupied by the second node according to the SA information, wherein an equivalent frequency domain position, of the resource occupied by the second node, in the state maintenance periodicity is the frequency domain position; and determine, for a resource at a time domain position later than or equal to the current state maintenance instance of time, an equivalent time domain position of the resource in the state maintenance periodicity according to the traffic transmission periodicity of the apparatus, and the time domain position of the resource.

11. The apparatus according to claim 10, wherein the SA information comprises at least one of:

information indicating a traffic transmission periodicity of the second node;

information indicating a remaining quantity of times that a resource occupied by the second node is able to be occupied; or information indicating a time-frequency position of a resource occupied by the second node.

12. The apparatus according to claim 11, wherein the information indicating the time-frequency position of the resource occupied by the second node comprises at least one of:

information indicating a frequency domain position of the resource occupied by the second node; or a first time offset, which represents an offset between an instance of time when the second node transmits the SA information, and a time domain position of the resource occupied by the second node.

13. The apparatus according to claim 10, wherein the at least one processor is further configured to execute the readable program codes to:

perform a modulus operation on the time domain position of the resource and the state maintenance periodicity; and determine a value obtained as a result of the modulus operation as the equivalent time domain position of the resource in the state maintenance periodicity.

14. The apparatus according to claim 10, wherein for the current state maintenance instance of time, the at least one processor is further configured to execute the readable program codes to determine the time domain position of the resource occupied by the second node according to the SA information in an equation of:

$$R\_t(n) = \text{offset} + n*T2;$$

wherein $R\_t(n)$ is the time domain position of the resource occupied by the second node; offset is a value of a second time offset corresponding to the current state maintenance instance of time, wherein the second time offset represents an offset between a state maintenance instance of time, and the time domain position of the resource occupied by the second node; T2 is a traffic transmission periodicity of the second node, and $n=0, 1, \ldots, N$, wherein N is a remaining quantity of times that the resource occupied by the second node is able to be occupied.

15. The apparatus according to claim 14, wherein if there is any one $R\_t(n)$ greater than or equal to 0, then a time domain position of a resource corresponding to $R\_t(n)$ is later than or equal to the current state maintenance instance of time; or if there is any one $R\_t(n)$ less than 0, then a time domain position of a resource corresponding to $R\_t(n)$ is earlier than the current state maintenance instance of time.

16. The apparatus according to claim 14, wherein the value of the second time offset corresponding to the current state maintenance instance of time is a value of the second time offset corresponding to a last state maintenance instance of time minus a time difference, wherein the time difference is an interval of time between the current state maintenance instance of time and the last state maintenance instance of time, wherein an initial value of the second time offset is determined according to a value of a first time offset in the SA information, and the first time offset represents an offset between an instance of time when the second node transmits the SA information, and the time domain position of the resource occupied by the second node.

17. The apparatus according to claim 10, wherein there is a same interval of time between any two adjacent state maintenance instances of time.

* * * * *